United States Patent
Axelrod et al.

(10) Patent No.: US 12,356,963 B2
(45) Date of Patent: Jul. 15, 2025

(54) PET CHEW ARTICLE CONTAINING LUFFA

(71) Applicant: T.F.H. PUBLICATIONS, INC., Neptune City, NJ (US)

(72) Inventors: Glen S. Axelrod, Colts Neck, NJ (US); Ajay Gajria, Holmdel, NJ (US)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 89 days.

(21) Appl. No.: 17/726,748

(22) Filed: Apr. 22, 2022

(65) Prior Publication Data
US 2022/0338446 A1   Oct. 27, 2022

Related U.S. Application Data

(60) Provisional application No. 63/201,310, filed on Apr. 23, 2021.

(51) Int. Cl.
| | |
|---|---|
| *A01K 15/02* | (2006.01) |
| *A23K 10/30* | (2016.01) |
| *A23K 20/105* | (2016.01) |
| *A23K 40/20* | (2016.01) |
| *A23K 50/40* | (2016.01) |

(52) U.S. Cl.
CPC ............ *A01K 15/026* (2013.01); *A23K 10/30* (2016.05); *A23K 20/105* (2016.05); *A23K 40/20* (2016.05); *A23K 50/40* (2016.05)

(58) Field of Classification Search
CPC .... A01K 15/025; A01K 15/026; A23K 40/20; A23K 50/40; A23K 10/30; A23K 20/105
See application file for complete search history.

(56) References Cited

U.S. PATENT DOCUMENTS

| | | | |
|---|---|---|---|
| 2,592,747 A | 4/1952 | Schumann | |
| 6,044,800 A | 4/2000 | Kubo et al. | |
| 2006/0048719 A1* | 3/2006 | Myers | A01K 29/00 |
| | | | 119/710 |
| 2010/0003393 A1 | 1/2010 | Torney et al. | |
| 2021/0205839 A1* | 7/2021 | Crane | B05D 1/18 |
| 2024/0042676 A1* | 2/2024 | Yadav | B29C 63/00 |

FOREIGN PATENT DOCUMENTS

| | | | |
|---|---|---|---|
| CA | 2655178 A1 * | 12/2007 | ............ A01K 15/02 |
| JP | 54-68352 | 6/1979 | |
| JP | 10-150925 | 6/1998 | |
| JP | 11-103709 | 4/1999 | |

(Continued)

OTHER PUBLICATIONS

Wikipedia, Thermoplastics, Mar. 12, 2021, https://en.wikipedia.org/wiki/Thermoplastic (Year: 2021).*

(Continued)

*Primary Examiner* — Joshua J Michener
*Assistant Examiner* — Henry Hooper Mudd
(74) *Attorney, Agent, or Firm* — Grossman, Tucker, Perreault & Pfleger, PLLC

(57) ABSTRACT

A pet chew article comprising *luffa* fibers and a polymer composition. The pet chew article may be formed by supplying *luffa* fibers, supplying a polymer composition combining the *luffa* fibers with the polymer composition and forming the pet chew article from the *luffa* fibers and the polymer composition.

22 Claims, 3 Drawing Sheets

(56) References Cited

FOREIGN PATENT DOCUMENTS

JP        2022078628 A     5/2022

OTHER PUBLICATIONS

International Search Report and Written Opinion from corresponding PCT Appln. No. PCT/US22/25896, dated Jul. 19, 2022. 9 pages.
Alhijazi, et al., "Recent Developments in Lu a Natural Fiber Composites: Review", Sustainability 2020, 12, 7683, pp. 1-25.
Office Action from related Japanese Appln. No. 2023-554057, dated Nov. 1, 2024. English translation attached.
Pterona dental green, Internet Archive, waybackmachine, URL: https://www.petio.com/item/4903588264931/. No English translation available, however concise explanation of relevancy can be found on the Nov. 1, 2024 Japanese Office Action.

* cited by examiner

PET CHEW ARTICLE CONTAINING LUFFA

CROSS-REFERENCE TO RELATED APPLICATIONS

This non-provisional patent application claims the benefit of the filing date of U.S. provisional patent application Ser. No. 63/201,310, filed Apr. 23, 2021, the entire disclosure of which is incorporated herein by reference.

FIELD OF THE INVENTION

The present disclosure relates to method of forming a pet chew article, and more particularly to a pet chew article containing *luffa* fiber.

BACKGROUND

*Luffa* (also spelled loofah or loofa) is a genus of tropical/subtropical, annual, climbing vine of the cucurbitaceae (cucumber) family (which also may be referred to as the cucurbits) of the kingdom of plantae. The family of cucurbits includes gourds, pumpkins and cucumbers. More particularly, *luffa* is of the cucurbitoideae sub-family, and even more particularly is of the sicyoeae tribe.

Major species of the genus *Luffa* include *Luffa aegyptiaca* (also referred by the synonym *Luffa cylindrica*), also referred to by the common name "loofah", which refers to the fruit, which is generally cylindrical and linear. Another major species is *Luffa acutangula*, also referred to by the common name "angled loofah", which refers to the fruit, which is generally cylindrical and curved.

The fruit of the species *Luffa aegyptiaca* and *Luffa acutangula* are edible for human consumption as a vegetable, however in order to be consumed as such, the fruit must be harvested before it is aged. As the fruit ages and dries, such results a fibrous three-dimensional interconnected web structure. This fibrous structure may be used as a sponge/scrubber, particularly for bathing, dishwashing or other cleaning applications.

SUMMARY

A method of forming a pet chew article comprising supplying *Luffa* fibers, supplying a polymer composition, combining the *Luffa* fibers with the polymer composition and forming the pet chew article from the *Luffa* fibers and the polymer composition.

In at least one embodiment, the *luffa* fibers are in a form of a fibrous web structure, and the method further comprises combining the fibrous web structure with the polymer composition.

In at least one embodiment, the polymer composition is a latex polymer composition, and the method further comprises combining the fibrous web structure with the latex polymer composition and drying the latex polymer composition.

In at least one embodiment, after drying the latex polymer composition, the *luffa* fibers are present in the pet chew article in a range of 5% by weight of the pet chew article to 80% by weight of the pet chew article.

In at least one embodiment, the latex polymer composition comprises a natural rubber latex.

In at least one embodiment, the latex polymer composition comprises 40% to 60% by weight of polyisoprene prior to drying the latex polymer composition.

In at least one embodiment, the polymer composition is a thermoplastic polymer composition, and the method further comprises melting the thermoplastic polymer composition and mixing the *luffa* fibers with the melted thermoplastic polymer composition.

In at least one embodiment, the *luffa* fiber are random *luffa* fibers, and the method further comprises mixing the random *luffa* fibers with the melted thermoplastic polymer composition.

In at least one embodiment, the polymer composition is a thermoset polymer composition, and the method further comprises combining the *luffa* fibers with the thermoset polymer composition.

In at least one embodiment, the method further comprises supplying precursors of the polymer composition, supplying the polymer composition by reacting the precursors of the polymer composition to form the polymer composition and mixing the *luffa* fibers with at least one of the precursors of the polymer composition before or during reacting the precursors of the polymer composition.

In at least one embodiment, the method further comprises forming the pet chew article as a molded pet chew article.

In at least one embodiment, the *luffa* fibers are present in the molded pet chew article in a range of 0.1% by weight of the molded pet chew article to 50% by weight of the molded pet chew article.

In at least one embodiment, the method further comprises forming the pet chew article as an injection molded pet chew article, extrusion molded pet chew article or a compression molded pet chew article.

In at least one embodiment, the *luffa* is at least one of *Luffa aegyptiaca* and *luffa acutangula*.

A method of forming a pet chew article comprising supplying *Luffa* fibers, supplying a liquid polymer latex and introducing the liquid polymer latex on and/or between said *Luffa* fibers and drying and forming the pet chew article. It should also be appreciated that the present invention is also directed at a pet chew article comprising *Luffa* fibers and one or more polymer resins, wherein the one or more polymer resins are sourced from a liquid polymer latex.

A method of forming a pet chew article comprising supplying *Luffa* fibers, supplying a thermoplastic resin, melting the thermoplastic resin and mixing with the fibers and forming a pet chew article, wherein the *Luffa* fibers are present at a level/range of 0.1% by weight to 50.0% by weight and the thermoplastic resin is present at a level/range of 99.9% by weight to 50.0% by weight.

A method of forming a pet chew article comprising supplying *Luffa* fibers, supplying thermoset resin precursors, mixing the thermoset resin precursors with the fibers and curing the thermoset resin precursors to form crosslinked polymer and the pet chew, wherein the *Luffa* fibers are present at a level/range of 0.1% by weight to 50.0% by weight and the crosslinked thermoset resin is present at a level/range of 99.9% by weight to 50.0% by weight.

A pet chew article comprising *luffa* fibers and a polymer composition, wherein the polymer composition is sourced from a latex polymer composition.

In at least one embodiment, the *luffa* fibers are in a form of a fibrous web structure;

In at least one embodiment, the *luffa* fibers are present in the pet chew article in a range of 5% by weight of the pet chew article to 80% by weight of the pet chew article.

In at least one embodiment, the polymer composition comprises natural rubber latex.

In at least one embodiment, the *luffa* fiber are random *luffa* fibers, and the random *luffa* fibers are present in the pet chew article in a range of 0.1% by weight of the pet chew article to 50% by weight of the pet chew article.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
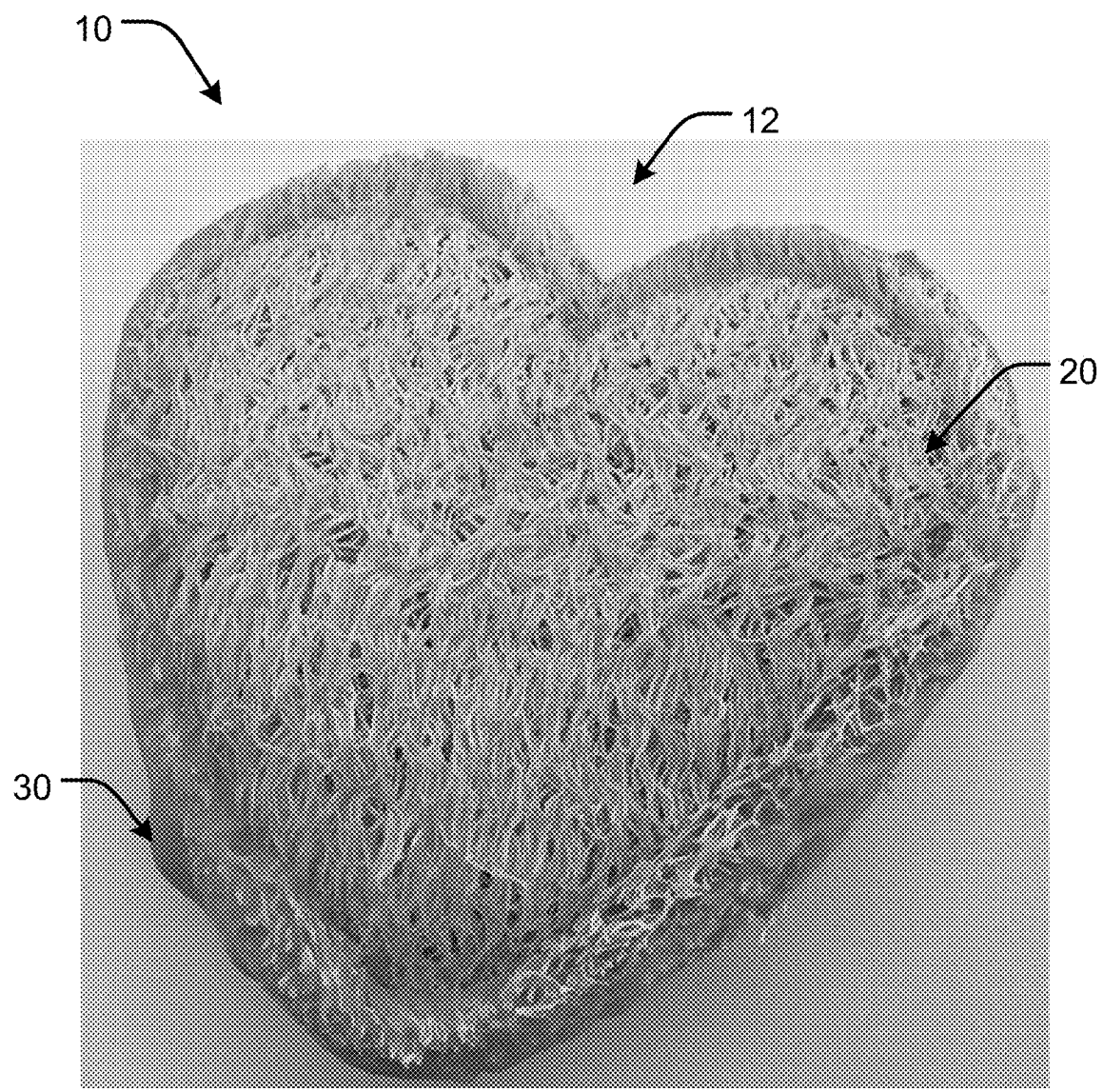
FIG. 1 is a front side view of a pet chew article containing *Luffa* fibers.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting.

The present disclosure relates to pet chew articles containing *Luffa*, methods of providing pet chew articles including *Luffa* and methods of entertaining pets with pet chew articles including *Luffa*. The *Luffa* is preferably *Luffa* from the fruit of the species *Luffa aegyptiaca* (also referred by the synonym *Luffa cylindrica*) and *Luffa acutangula*. The *Luffa* may be in a form of a fibrous, three-dimensional, interconnected web structure, which is disposed in or otherwise combined with a base (polymer) composition. In other embodiments of the article, the *Luffa* may be in a form of random (loose unconnected) fibers disposed with the base (polymer) composition. In other embodiments of the article, the *Luffa* may be in a form of both a fibrous, three-dimensional, interconnected web structure, as well as random (loose unconnected) fibers disposed with the base composition.

Figure 2:
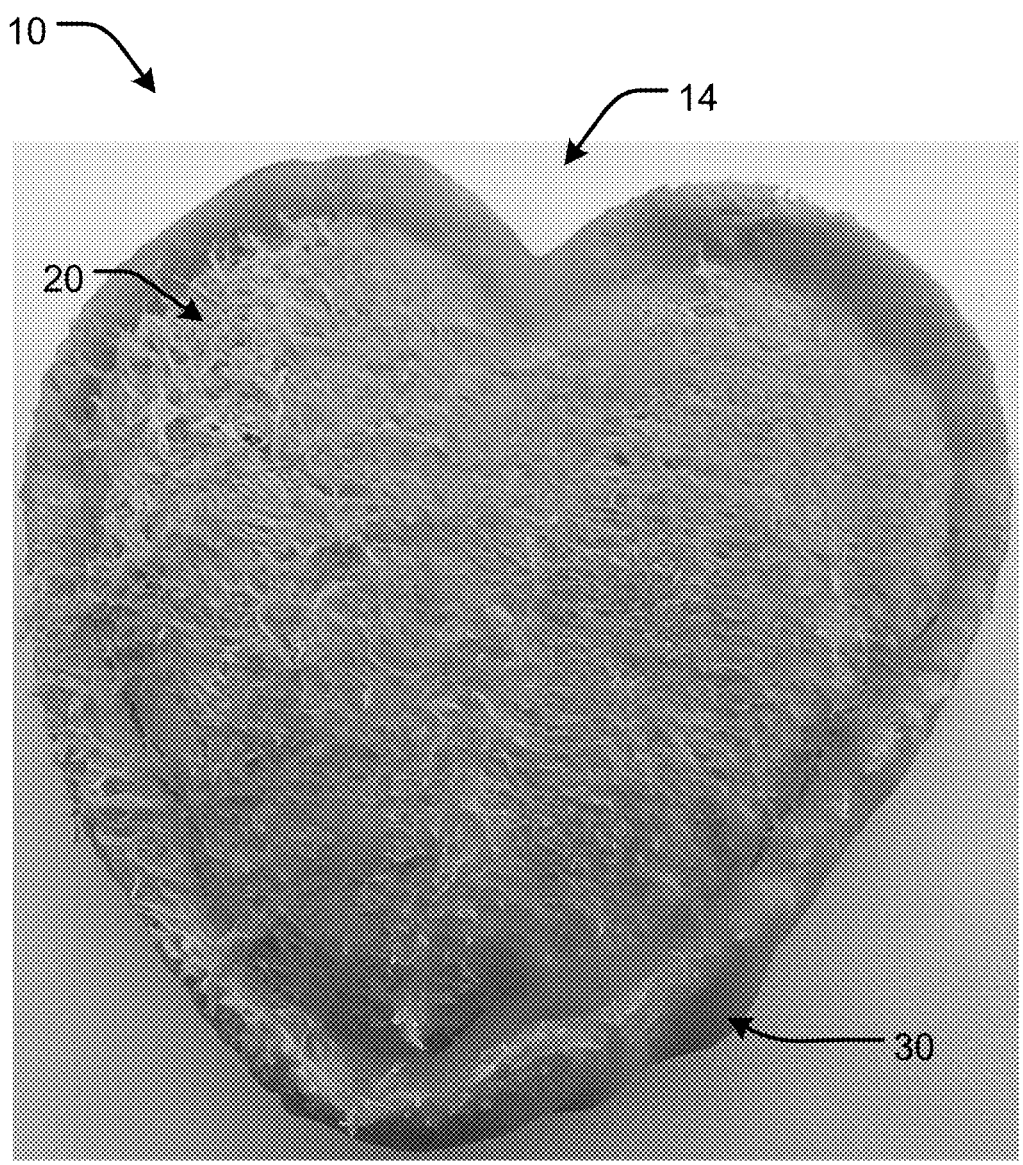
FIG. 2 is a back side view of a pet chew article of FIG. 1.

An example of a non-limiting embodiment of a pet chew article contemplated herein is illustrated in FIGS. 1 and 2. The pet chew article 10 may take on a number of forms, in the illustration, the pet chew article 10 is a planar article in the general form of a heart shape. Other forms may also be provided, such as bone shapes, geometric shapes or shapes simulating various food products.

As shown the pet chew article 10 comprising the *Luffa* may in a form of a fibrous, three-dimensional, interconnected web structure 20, shown as a mesh of interconnected fibers, which is at least partially encapsulated, disposed in otherwise combined with a base (polymer) composition 30, to form a composite. The fibrous web structure 20 is identified to be relatively more prominent on one side 12 (e.g. front side) of the article 10 in FIG. 1, while the base (polymer) composition 30 is identified to be relatively more prominent on the perimeter of FIG. 1 and the opposite side 14 (e.g. back side) in FIG. 2. Stated another way, with regards to the opposite sides 12 and 14 of the pet chew article 10, the fibrous, three-dimensional, interconnected web structure 20 may be more encapsulated on one side 14 of the pet chew article 10 than on the other side 12 of the pet chew article 10. In the article 10 shown in FIGS. 1 and 2, it should be recognized that while shown on the surface of the article 10, the web structure 20 and the base (polymer) composition 30 is also present within the pet chew article 10, i.e. throughout the thickness).

The fibrous web structure 20 may be obtained from drying the *Luffa* fruit, removing the outer skin from the inner fibrous web structure and thereafter cleaning the fibrous web structure in a known manner. The fibrous web structure 20 may be cut into sections, depending on the size of the fruit.

Ingredients/components of the base (polymer) composition 30 may include one or more polymeric resins, including synthetic or natural or naturally derived polymeric resin, which may be combined with the fibrous web structure 20 using a number of application techniques, including molding processes.

As alluded to above, the pet chew article 10 may include, as the base (polymer) composition, having one or more polymeric resins, which may include synthetic or natural or naturally derived polymeric resins. Polymeric resins may particularly include resins that do not exhibit toxic and/or injurious effects on biological systems, such as the digestive track of a pet. Such resins, understood as biocompatible resins may be edible, but may or may not be digestible. Non-limiting examples of edible natural or naturally derived resins may include starch, gluten, casein and gelatin.

Non-limiting examples of synthetic polymeric resin may include polyurethane, polyamides (nylon), polyester, polysiloxanes (silicones), and thermoplastic (repeatedly moldable) or thermoset (crosslinked) resins or elastomers.

An elastomer herein may be understood as any material with a glass transition temperature Tg below room temperature and which is at most, 50% crystalline (i.e., the material contains an amorphous phase of 50% or greater, up to 100% amorphous phase). As used herein, an elastomer may be characterized as a material that has an elongation at 23° C. of at least 100%, and which, after being stretched to twice its original length and being held at such for one minute, may recover in a range of 50% to 100% within one minute after release from the stress. More particularly, the elastomer may recover in a range of 75% to 100% within one minute after release from the stress, and even more particularly recover in a range of 90% to 100% within one minute after release from the stress.

The elastomer may be comprised of any polymer, including natural or synthetic polymers, and thermoplastic or thermoset polymers. Thus, the elastomer may be either a natural or synthetic elastomer. The elastomer may comprise, essentially consist of or consist of natural or synthetic rubber, which may include, acrylic rubber, butadiene rubber, butyl rubber, ethylene propylene rubber, ethylene propylene rubber diene monomer rubber, fluorocarbon rubber, isoprene rubber, nitrile rubber including hydrogenated nitrile rubber, polyurethane rubber, silicone rubber and styrene block copolymer (e.g. styrene butadiene rubber, styrene ethylene/butylene styrene rubber). Particular elastomers may include polysiloxane elastomers, which may again be either thermoplastic or thermoset.

In one particular embodiment, the base (polymer) composition 30 as shown in FIGS. 1 and 2, in the form of a polymeric resin, is one that is derived from a latex (polymer) composition. A latex (polymer) composition is reference to a dispersion (emulsion) of particles, such as microparticles, of one or more polymers in water. The latex utilized herein may be a natural latex, an example of which would be the latex of natural rubber (polyisoprene). In addition, the latex herein may comprise a latex of synthetic polymer, wherein the polymer is synthesized and then dispersed in water. The synthetic polymer that may be utilized also contemplates the use of polystyrene and polybutadiene, which may be otherwise identified as SBR or styrene-butadiene rubber. Generally, the latex herein may particularly contain 40% by weight to 60% by weight of polymer (e.g. polyisoprene) with the balance of water in the range of 60-40% by weight. Other components may also be present, particularly in a natural rubber latex, which can contain up to 5.0% by weight of proteins, fatty acids, and inorganic materials (e.g. inorganic salts).

As may therefore be appreciated, the *Luffa* fibrous structure may be at least partially, or fully, immersed in a selected natural or synthetic liquid latex, such as by being dip coated, and then heated and dried (to remove the water from the latex), leaving the polymeric resin of the latex and other dried solid components from the latex as a coating on and/or between the *Luffa* fibers. See again, FIGS. 1 and 2. In one embodiment, once dried, the *Luffa* fibers are particularly present at a level/range of 5.0% (wt.) to 80.0% (wt.) of the pet chew and the level/range of polymer resin (synthetic and/or natural) along with other dried solid components from the latex are present at a level of 95.0% (wt.) to 20.0% (wt.) of the pet chew (with polymer at 90.0% (wt.) to 15.0% (wt.) of the pet chew).

Alternatively, once dried, the *Luffa* fibers may be present at a level/range of 10.0% (wt.) to 80.0% (wt.) of the pet chew and the level/range of polymer resin (synthetic and/or natural) along with other dried solid components from the latex are present at a level/range of 90.0% (wt.) to 20.0% (wt.) of the pet chew (with polymer at 85.0% (wt.) to 15.0% (wt.) of the pet chew).

Alternatively, once dried, the *Luffa* fibers may be present at a level/range of 20.0% (wt.) to 80.0% (wt.) of the pet chew and the level/range of polymer resin (synthetic and/or natural) along with other dried solid components from the latex are present at a level/range of 80.0% (wt.) to 20.0% (wt.) of the pet chew (with polymer at 75.0% (wt.) to 15.0% (wt.) of the pet chew).

Alternatively, once dried, the *Luffa* fibers may be present at a level/range of 30.0% (wt.) to 80.0% (wt.) of the pet chew and the level/range of polymer resin (synthetic and/or natural) along with other dried solid components from the latex are present at a level/range of 70.0% (wt.) to 20.0% (wt.) of the pet chew (with polymer at 65.0% (wt.) to 15.0% (wt.) of the pet chew).

Alternatively, once dried, the *Luffa* fibers may be present at a level/range of 40.0% (wt.) to 80.0% (wt.) of the pet chew and the level/range of polymer resin (synthetic and/or natural) along with other dried solid components from the latex are present at a level/range of 60.0% (wt.) to 20.0% (wt.) of the pet chew (with polymer at 55.0% (wt.) to 15.0% (wt.) of the pet chew).

Alternatively, once dried, the *Luffa* fibers may be present at a level/range of 50.0% (wt.) to 80.0% (wt.) of the pet chew and the level/range of polymer resin (synthetic and/or natural) along with other dried solid components from the latex are present at a level/range of 50.0% (wt.) to 20.0% (wt.) of the pet chew (with polymer at 45.0% (wt.) to 15.0% (wt.) of the pet chew).

Alternatively, once dried, the *Luffa* fibers may be present at a level/range of 60.0% (wt.) to 80.0% (wt.) of the pet chew and the level/range of polymer resin (synthetic and/or natural) along with other dried solid components from the latex are present at a level/range of 40.0% (wt.) to 20.0% (wt.) of the pet chew (with polymer at 34.0% (wt.) to 15.0% (wt.) of the pet chew).

In certain embodiments, the *Luffa* fibers may include fibers which are formed from grinding or otherwise milling the fibrous structure of the *Luffa* fruit to form what may be termed loose fibers. The loose (random) *Luffa* fibers may then be mixed into any one of the polymer compositions noted above. Such *Luffa* fibers may particularly have a mesh size of 20-40. The *Luffa* fibers may particularly be present in the polymer resin at a level/range from 0.1% by weight to 50.0% by weight, and the polymer resin may be present at a level/range of 99.9% by weight to 50.0% by weight. The *Luffa* fibers may more preferably be present at a level/range of 0.1% by weight to 10.0% by weight, in which case the polymer resin is present at a level/range of 99.9% by weight to 90.0% by weight. Even more preferably, the *Luffa* fibers are present at a level/range of 0.1% by weight to 5.0% by weight, and the polymer resin is present at a level/range of 99.9% by weight to 95.0% by weight.

Figure 3:
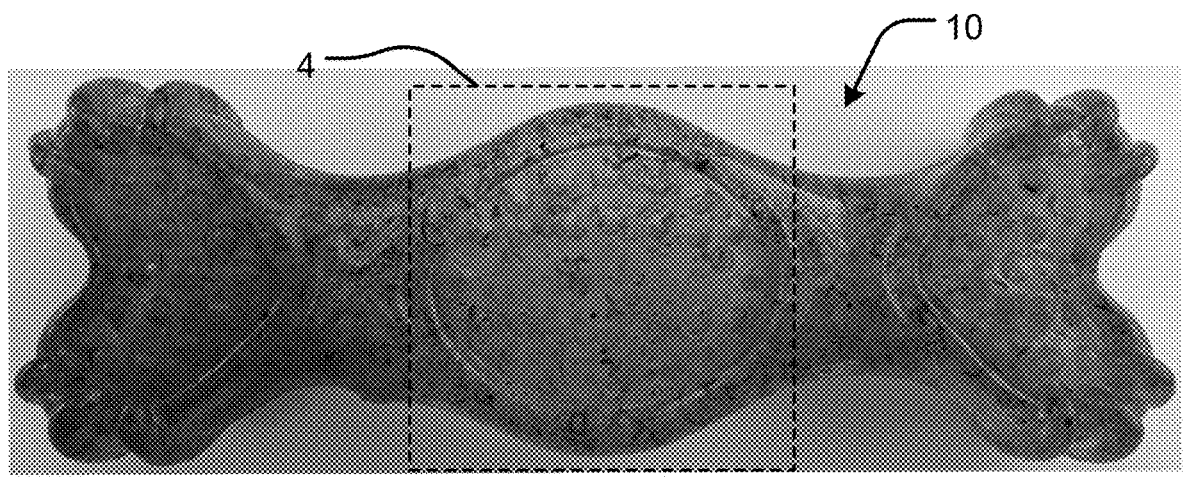
FIG. 3 is a front side view of another pet chew article containing *Luffa* fibers.
Figure 4:
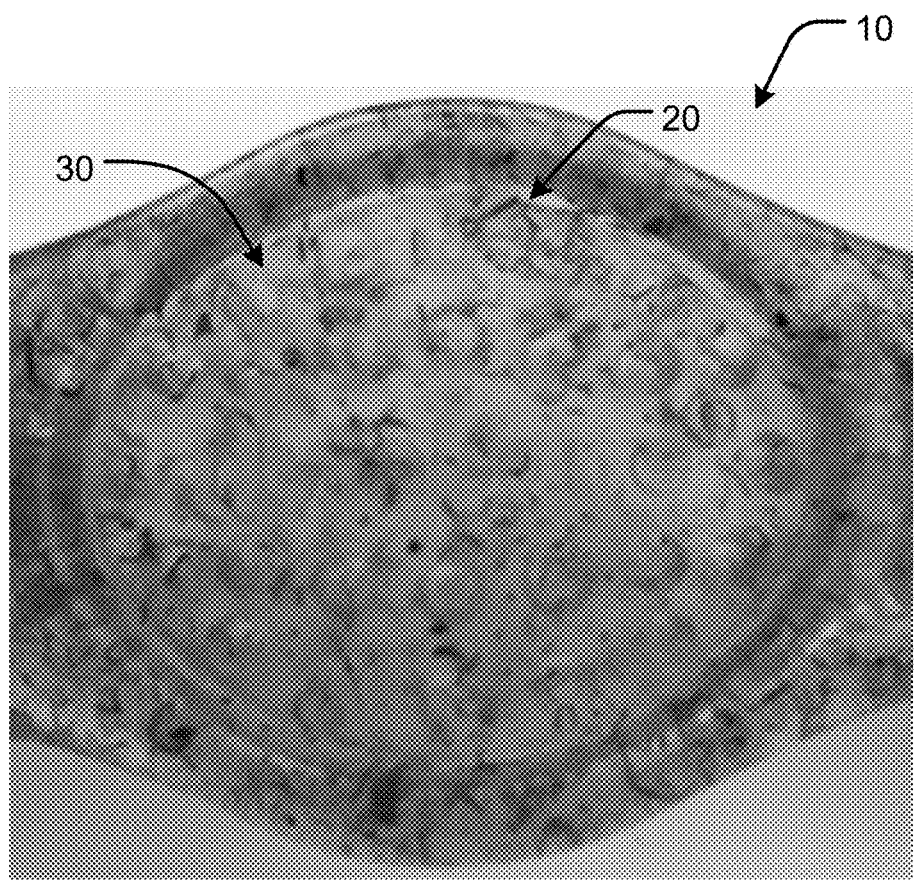
FIG. 4 is a close-up view of the pet chew article of FIG. 3 as bounded by dashed rectangle 4.

When the base (polymer) composition 30 is a thermoplastic polymer composition, such mixing may particularly be achieved by melt mixing, in processes such as extrusion, compression and/or injection (reciprocating screw or plunger) molding. For example, the thermoplastic polymer composition may be heated and melted in a barrel of an extruder or an injection molding machine, and the loose (random) *Luffa* fibers may then be added to and mixed with the melted thermoplastic polymer composition in the barrel via a hopper, particularly with the assistance of a screw within the barrel. See FIGS. 3 and 4. Alternatively, the *Luffa* fibers may be in the form of the fibrous web structure 20, which may be placed in a molding cavity of injection mold prior to introduction of the heated/melted thermoplastic polymer composition to the mold cavity.

When the base (polymer) composition 30 is a thermoset polymer composition, the fibrous web structure 20, may similarly be placed in a molding cavity of a mold (e.g. reaction injection mold), prior to introduction of the thermoset polymer composition to the mold cavity. It can be appreciated that the *Luffa* fibers may also be mixed with the precursors (e.g., multi-functional monomers) for formation of the thermoset crosslinked polymer, following by curing and crosslinked thermoset polymer formation. For example, in the case of loose (random) *Luffa* fibers, such may be added to one of the precursors of the thermoset polymer composition. For example, for a polyurethane formed by reaction injection molding, the loose (random) *Luffa* fibers may be added to and mixed with a polyol precursor stream prior to the polyol being mixed with an isocyanate precursor stream. The polyol and isocyanate precursor streams may then be mixed in a mixhead to start the reaction and injected into a molding cavity. Thus, the loose (random) *Luffa* fibers may be mixed with a precursor of the thermoset polymer composition before and/or during reacting the precursors of the thermoset polymer composition. In addition, in the case of thermoset resins, one could mix and then proceed with, e.g, compression molding, particularly my mixing the precursors along with the loose (random) *Luffa* fibers and partially curing (B-stage) before introducing such into the molding cavity for full curing.

In any of the above embodiments, one may optionally include other additives in the formulation, including, but not limited to a flavor additive that is appealing to the animal, an attractant, nutritional additives (vitamins or minerals), and/or cosmetic additives, such as a colorant.

The pet chew article 10 herein is contemplated to exhibit a sufficient hardness and ductility to be repeatedly mechanically abraded by a pet's teeth before structural integrity of the pet chew article is reduced and, e.g., breaks into one or more pieces.

The hardness of the pet chew article 10 herein containing *Luffa* fibers, as measured by ASTM D2240-05 (2010), is contemplated to be in the range of Shore 70A to Shore 80D, including all values and whole number ranges therein, including e.g. 98A, 50D, etc. The hardness of the formed pet chew articles 10 may be in the range of 25 to 40 Shore D, including 30 to 33 Shore D.

The pet chew articles 10 herein containing the *Luffa* fibers is contemplated to exhibit an elongation at break, as measured by ASTM D638-10, in the range of 0.5% to 600% and all values therein in 1% increments, such as 1% to 7%.

The tensile modulus of the pet chew articles 10 containing *Luffa* fiber, particularly the latex polymer composition as measured by ASTM D638-10, is contemplated to be in the range of $5 \times 10^2$ psi to $50 \times 10^3$ psi (500 psi to 50,000 psi, or 3.45 MPa to 344.74 MPa), including all values and ranges therein, such as $5 \times 10^2$ psi to $25 \times 10^3$ psi (500 psi to 25,000 psi, or 3.45 MPa to 172.37 MPa), in 1 psi (0.0069 MPa) increments. Furthermore, the flexural modulus of the pet chew articles 10 herein containing the *Luffa* fibers, as measured by ASTM D790-10, is contemplated to be in the range of $1 \times 10^2$ psi to $25 \times 10^3$ psi (100 psi to 25,000 psi, or 0.69 MPa to 172.37 MPa), including all values and ranges therein, such as $1 \times 10^2$ psi to $10 \times 10^3$ psi (100 psi to 10,000 psi, or 0.69 MPa to 68.95 MPa), in 1 psi (0.0069 MPa) increments.

In addition, the tensile modulus of the pet chew articles 10 containing *Luffa* fiber, particularly the injection, extrusion or compression molded pet chew articles, as measured by ASTM D638-10, is contemplated to be in the range of $50 \times 10^3$ psi to $500 \times 10^3$ psi (50,000 psi to 500,000 psi, or 344.74 MPa to 3,447.38 MPa), including all values and ranges therein, such as $50 \times 10^3$ psi to $300 \times 10^3$ psi (50,000 psi to 300,000 psi, or 344.74 MPa to 2,068.43 MPa), in 1 psi (0.0069 MPa) increments. Furthermore, the flexural modulus of the pet chew articles 10 herein containing the *Luffa* fibers), as measured by ASTM D790-10, is contemplated to be in the range of $50 \times 10^3$ psi to $500 \times 10^3$ psi (50,000 psi to 500,000 psi, or 344.74 MPa to 3,447.38 MPa, including all values and ranges therein, such as $50 \times 10^3$ psi to $300 \times 10^3$ psi (50,000 psi to 300,000 psi, or 344.74 MPa to 2,068.43 MPa), in 1 psi (0.0069 MPa) increments. An individual pet chew articles 10 may exhibit one or more of the above properties, i.e., hardness, elongation at break, and tensile modulus.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed:

1. A method of forming a pet chew article comprising:
supplying loose *luffa* fibers wherein the loose *luffa* fibers are unconnected to one another and formed by grinding or milling a *luffa* fibrous web structure;
supplying a thermoplastic polymer composition;
melting the thermoplastic polymer composition;
mixing the loose *luffa* fibers with the melted thermoplastic polymer composition such that the loose *luffa* fibers are randomly disposed in the melted thermoplastic polymer composition; and
after mixing the loose *luffa* fibers with the melted thermoplastic polymer composition, molding the pet chew article as an injection molded pet chew article, an extrusion molded pet chew article or a compression molded pet chew article.

2. The method of claim 1 wherein:
the loose *luffa* fibers are present in the injection, extrusion or compression molded pet chew article in a range of 0.1% to 50% by weight of the injection, extrusion or compression molded pet chew article.

3. The method of claim 1 wherein:
the loose *luffa* fibers are at least one of *luffa aegyptiaca* and *luffa acutangula*.

4. The method of claim 1 wherein:
the injection, extrusion or compression molded pet chew article has a tensile modulus, as measured by ASTM D638-10, in a range of 50,000 psi to 500,000 psi.

5. The method of claim 1 wherein:
the injection, extrusion or compression molded pet chew article has a flexural modulus, as measured by ASTM D790-10, in a range of 50,000 psi to 500,000 psi.

6. The method of claim 1 wherein:
the loose *luffa* fibers are present in the injection, extrusion or compression molded pet chew article in a range of 0.1% to 10% by weight of the injection, extrusion or compression molded pet chew article.

7. The method of claim 1 wherein:
the injection, extrusion or compression molded pet chew article is an injection molded pet chew article.

8. The method of claim 1 wherein:
the injection, extrusion or compression molded pet chew article is an extrusion molded pet chew article.

9. The method of claim 1 wherein:
the thermoplastic polymer composition comprises at least one polymeric resin, wherein the at least one polymeric resin is a synthetic, natural or naturally derived polymeric resin.

10. The method of claim 1 wherein:
the thermoplastic polymer composition comprises at least one polymeric resin, wherein the at least one polymeric resin is at least one of biocompatible, edible or digestible.

11. The method of claim 1 wherein:
the thermoplastic polymer composition comprises at least one polymeric resin, wherein the at least one polymeric resin is at least one of polyurethane, polyamide, polyester, polysiloxane, elastomer, starch, gluten, casein or gelatin.

12. A method of forming a pet chew article comprising:
melting a thermoplastic polymer composition;
mixing loose *luffa* fibers with the melted thermoplastic polymer composition such that the loose *luffa* fibers are randomly disposed in the melted thermoplastic polymer composition, wherein the loose *luffa* fibers are unconnected to one another and formed by grinding or milling a *luffa* fibrous web structure; and
after mixing the *luffa* fibers with the melted thermoplastic polymer composition, molding the pet chew article as an injection molded pet chew article, extrusion molded pet chew article or a compression molded pet chew article.

13. The method of claim 12 wherein:
the loose *luffa* fibers are at least one of *luffa aegyptiaca* and *luffa acutangula*.

14. The method of claim 12 wherein:
the loose *luffa* fibers are present in the injection, extrusion or compression molded pet chew article in a range of 0.1% to 50% by weight of the injection, extrusion or compression molded pet chew article.

15. The method of claim 12 wherein:
the loose *luffa* fibers are present in the injection, extrusion or compression molded pet chew article in a range of 0.1% to 10% by weight of the injection, extrusion or compression molded pet chew article.

16. The method of claim 12 wherein:
the injection, extrusion or compression molded pet chew article has a tensile modulus, as measured by ASTM D638-10, in a range of 50,000 psi to 500,000 psi.

17. The method of claim 12 wherein:
the injection, extrusion or compression molded pet chew article has a flexural modulus, as measured by ASTM D790-10, in a range of 50,000 psi to 500,000 psi.

18. The method of claim 12 wherein:
the injection, extrusion or compression molded pet chew article is an injection molded pet chew article.

19. The method of claim 12 wherein:
the injection, extrusion or compression molded pet chew article is an extrusion molded pet chew article.

20. The method of claim 12 wherein:
the thermoplastic polymer composition comprises at least one polymeric resin, wherein the at least one polymeric resin is a synthetic, natural or naturally derived polymeric resin.

21. The method of claim 12 wherein:
the thermoplastic polymer composition comprises at least one polymeric resin, wherein the at least one polymeric resin is at least one of biocompatible, edible or digestible.

22. The method of claim 12 wherein:
the thermoplastic polymer composition comprises at least one polymeric resin, wherein the at least one polymeric resin is at least one of polyurethane, polyamide, polyester, polysiloxane, elastomer, starch, gluten, casein or gelatin.

* * * * *